Aug. 18, 1959     J. S. NAYFACK     2,899,746
DENTAL APPLIANCE
Filed Oct. 10, 1957
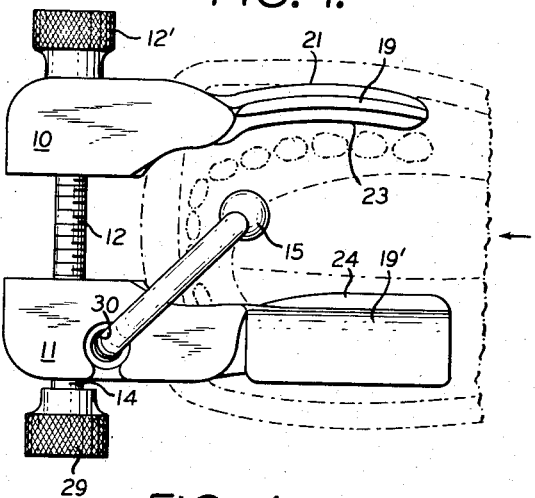
FIG. 1.
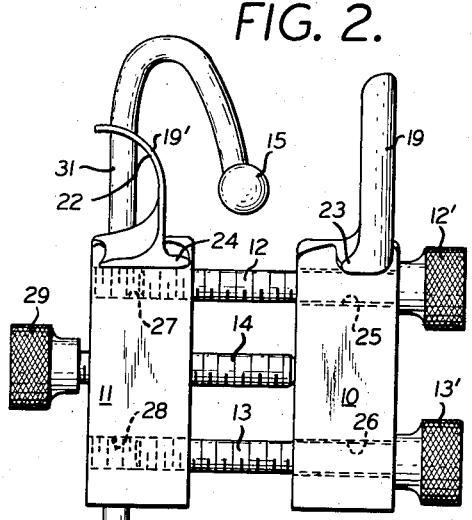
FIG. 2.
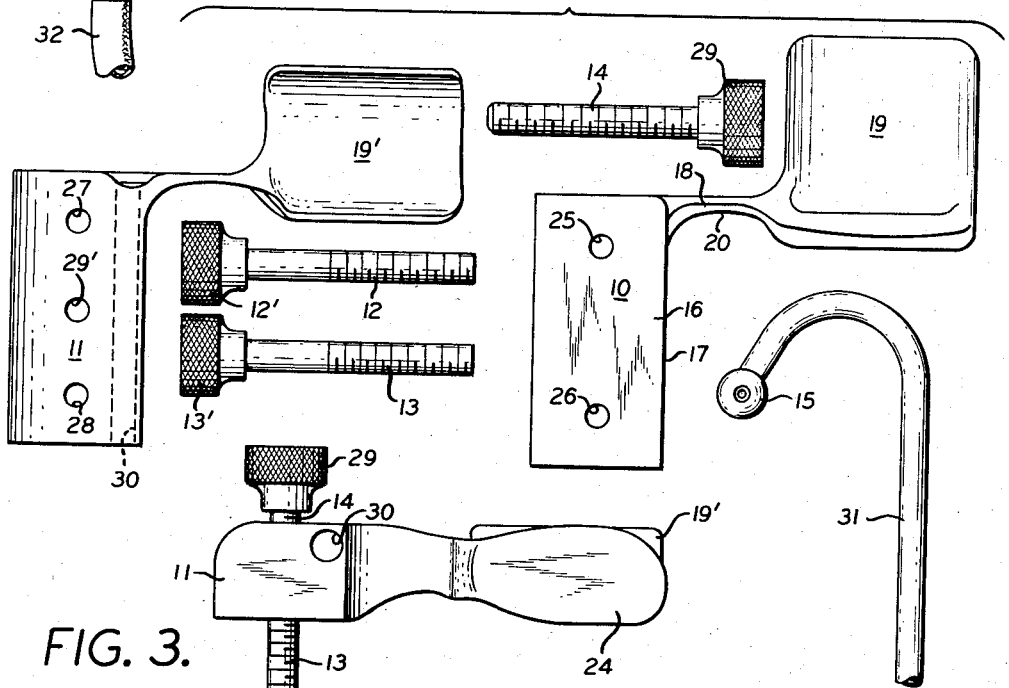
FIG. 3.
FIG. 4.
INVENTOR
JULES S. NAYFACK
BY
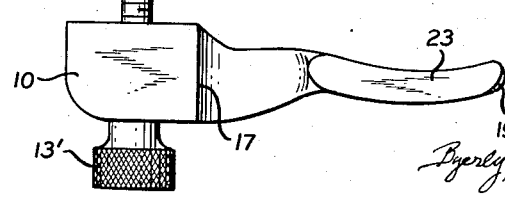
ATTORNEYS.

2,899,746
DENTAL APPLIANCE

Jules S. Nayfack, New York, N.Y.

Application October 10, 1957, Serial No. 689,348

8 Claims. (Cl. 32—40)

The present invention relates to a dental appliance and aims to provide certain improvements therein.

The primary object of the invention is to provide a dental appliance which may be inserted into the mouth of a patient and held therein by its novel configuration without the assistance of a nurse or the patient and which will serve as a protective shield to enable a dentist to work without fear of cutting or injuring the tongue, cheek or floor of the mouth of the patient.

A further object of the invention is to provide a dental appliance of the character set forth which is adjustable for use with oral cavities of different sizes.

A still further object of the invention is to provide a dental appliance which will provide bearings or fulcrums for aiding a dentist in his drilling and grinding operations.

A still further object of the invention is to provide an appliance of the character set forth which carries a salvia ejector adapted to be positioned and held within the oral cavity.

The foregoing and other objects and advantages of the invention, not specifically recited, are accomplished by providing a dental appliance comprising a pair of body members, means carried by the body members for adjusting and holding them in laterally spaced relation, each body member having a rearwardly extending relatively flat flange terminating in a curved guard plate extending upwardly from the flange substantially perpendicularly thereto. The invention will be better understood from the detailed description which follows when considered in conjunction with the accompanying drawing showing a preferred embodiment and wherein:

Fig. 1 is a top plan view of a dental appliance embodying the invention, the appliance being shown as positioned within an oral cavity, shown in phantom;

Fig. 2 is an end elevation of the appliance shown in Fig. 1 taken at a right angle thereto in the direction of the arrow;

Fig. 3 is a bottom plan view of the dental appliance;

Fig. 4 is an exploded view of the component parts of the appliance.

Referring to the drawing the dental appliance may be said to consist of the following component parts, a pair of body members 10, 11, screw-threaded means 12, 13 and 14 carried by the body members for adjusting and holding them in laterally spaced relation and a saliva ejector 15.

The body members 10 and 11 which may be formed of any suitable material, preferably cast aluminum or molded synthetic plastic, each consists of a generally rectangular block 16 having a generally flat rear face 17 adapted to engage the front of the chin of a patient, a rearwardly directed generally flat flange 18 extending from the top of the block 16 and each flange 18 terminating in a curved guard plate 19 or 19' extending upwardly from the flat flange 18 and substantially perpendicularly thereto. The flanges 18 each has a generally flat top face and a substantially concave bottom face 20 adapted to engage over the lip of a patient. The guard plate 19 has an outer convex surface 21 adapted to engage the inner side of a cheek of the patient and the guard plate 19' has an outer concave surface 22 adapted to engage over the tongue of a patient and hold it down. The inner surface of the guard plate 19' is convex to provide clearance for dental operations. The guard plate 19 has a base flange 23 extending from its inner surface and the guard plate 19' has a base flange 24 extending from its inner surface toward the base flange 22 and said base flanges are adapted to seat or rest on the floor of the mouth of a patient.

The screw-threaded means for adjusting and holding the body members in laterally spaced relation as herein shown consists of knurled heads 12', 13' on the screws 12 and 13 respectively, said screws freely passing through openings 25 and 26 respectively in the body member 10 and engaging in tapped openings 27 and 28 respectively in the body member 11 and a knurled head 29 on the screw 14 which latter screw threadedly engages through a tapped opening 29' in the body member 11, the free end of the screw being adapted to abut against a wall of the body member 10 and serve as locking means for the adjustment of the body members of the screws 12 and 13.

The body member 11 is formed with an upright opening 30 therethrough within which the stem portion 31 of the saliva ejector 15 loosely extends so as to permit longitudinal and rotational movement of the saliva ejector with respect to the body member and thereby provide for selective positioning of the saliva ejector within the mouth of a patient. As is conventional the saliva ejector tube may be connected with a flexible hose 32 to a source of ejection or suction.

In use, the dental appliance may be adjusted to fit comfortably within the oral cavity and when therein positioned it will be supported by the concave surfaces 20 on the flanges 18 resting on the lips of the patient, the bottom of the flat flanges on the guard plates resting on the floor of the mouth and the faces 17 of the body members bearing against the front of the chin. The guard plate 19 and its base flange 23 and the guard plate 19' and its base flange 24 will protect the cheek, tongue and floor of the mouth while the flanges 18 will provide bearings or fulcrums to enable the dentist to perform his operations of drilling and grinding and thereby reduce accidental slippage of the operating instrument. It will furthermore be appreciated that the dentist can also with his fingers move the appliance to the right or to the left as he may find necessary in his operative work.

The appliance will not be uncomfortable to the patient since it provides an equalization of reactive pressure of the cheek against the outer surface of the cheek guard; the housing of the tongue within its protective guard, and the base flanges on the guard plates, which parts completely surround the working area and also exerts a downward pressure; and the weight of the appliance externally of the oral cavity which bears against the chin.

Although the appliance as herein disclosed shows a cheek guard 19 engaging the inside of the right cheek of the patient, it will be apparent that said guard may be formed on the body member 11 to engage the left cheek and the tongue guard formed on the body member 10.

From the foregoing detailed description it will be appreciated that the appliance is capable of accomplishing the various objects of the invention as set forth in the opening statement and it will be further appreciated that the invention which shows a preferred embodiment may be modified within the range of mechanical skill without departing from the spirit of the invention as claimed.

What I claim is:

1. A dental appliance comprising a pair of body members, means carried by the body members for adjusting and holding them in laterally spaced relation, each body member having a rearwardly extending relatively flat flange terminating in a curved guard plate extending upwardly from the flange substantially perpendicularly thereto and each of the guard plates has a base flange directed toward the other.

2. A dental appliance according to claim 1, wherein the relatively flat flanges each has a substantially flat top face and a substantially concave bottom face.

3. A dental appliance according to claim 1, wherein one guard plate has an outer convex surface adapted to engage the inner side of a cheek of a patient and the other guard plate has an outer concave surface adapted to engage over the tongue of the patient.

4. A dental appliance according to claim 1, wherein the guard plates each also extend downwardly below the rearwardly extending relatively flat flange.

5. A dental appliance according to claim 1, wherein at least one of the body members carries a swivelly mounted saliva ejector which is movable substantially perpendicularly to the rearwardly extending flat flange on the body member.

6. A dental appliance according to claim 1, wherein the means carried by the body members for adjusting and holding them in laterally spaced relation comprises at least one headed screw loosely extending through one body member and engaging screw-threadedly the other body member.

7. A dental appliance for facilitating operations upon the teeth of the lower jaw to keep the cheek and tongue and floor of the oral cavity from contact with and immediate proximity to the teeth being operated upon, comprising a pair of body members provided with means for adjusting and holding said body members in laterally spaced relation, each body member having a part adapted to engage the front of the chin of a patient, a rearwardly extending flange at the top of each body member and having a bottom concave face adapted to seat upon the lower lip of a patient, said flanges each terminating in a curved guard plate extending both above and below said flange substantially perpendicularly thereto, each guard plate having a base flange adapted to rest on the floor of the oral cavity and said base flanges being directed toward each other.

8. A dental appliance for facilitating operations upon the teeth of the lower jaw to keep the cheek and tongue and floor of the oral cavity from contact with and immediate proximity to the teeth being operated upon, comprising a pair of body members provided with means for adjusting and holding them in laterally spaced relation, said body members each having a rear face disposed in substantially a common plane adapted to engage the front of the chin of a patient, an element extending rearwardly from the top of each body member and having a bottom concave face adapted to seat upon the lower lip of a patient and each of said elements terminating in a curved guard plate, one guard plate for a cheek and the other for the tongue, the bottoms of said guard plates being adapted to rest on the floor of the oral cavity when the appliance is in operative position.

References Cited in the file of this patent

FOREIGN PATENTS 324,497     France _____ Sept. 16, 1902

OTHER REFERENCES

Tiemann: Surgical Instrument Catalogue, 1889, p. 237, Figure 2375. Copy in 128–12.